(12) United States Patent
Ge et al.

(10) Patent No.: US 12,312,429 B2
(45) Date of Patent: May 27, 2025

(54) ACID-FUNCTIONALIZED COPOLYMERS OF METHYL METHACRYLATE AND ACRYLIC RESIN COMPOSITIONS BASED THEREON

(71) Applicant: Trinseo Europe GmbH, Horgen (CH)

(72) Inventors: Jiaxin Jason Ge, Lower Providence, PA (US); Noah E. Macy, Royersford, PA (US); Florence Mehlmann, Berwyn, PA (US); Estelle Meurice Pierrat, Corneville sur-Risle (FR)

(73) Assignee: Trinseo Europe GmbH, Pfaeffikon (CH)

(*) Notice: Subject to any disclaimer, the term of this patent is extended or adjusted under 35 U.S.C. 154(b) by 88 days.

(21) Appl. No.: 17/896,691

(22) Filed: Aug. 26, 2022

(65) Prior Publication Data

US 2022/0411552 A1 Dec. 29, 2022

Related U.S. Application Data

(63) Continuation of application No. 16/484,837, filed as application No. PCT/US2018/018842 on Feb. 20, 2018, now abandoned.

(60) Provisional application No. 62/461,009, filed on Feb. 20, 2017.

(51) Int. Cl.
| | | |
|---|---|---|
| *C08F 220/14* | (2006.01) | |
| *C08F 220/06* | (2006.01) | |
| *C08F 220/08* | (2006.01) | |
| *C08F 220/18* | (2006.01) | |
| *C08F 301/00* | (2006.01) | |
| *C08K 5/00* | (2006.01) | |
| *C08K 5/3492* | (2006.01) | |
| *C08K 5/49* | (2006.01) | |
| *C08L 33/12* | (2006.01) | |

(52) U.S. Cl.
CPC .......... *C08F 220/14* (2013.01); *C08F 220/06* (2013.01); *C08F 220/08* (2013.01); *C08F 301/00* (2013.01); *C08K 5/005* (2013.01); *C08K 5/3492* (2013.01); *C08K 5/49* (2013.01); *C08L 33/12* (2013.01); *C08F 220/1802* (2020.02); *C08F 220/1804* (2020.02); *C08L 2201/10* (2013.01); *C08L 2205/02* (2013.01)

(58) Field of Classification Search
None
See application file for complete search history.

(56) References Cited

U.S. PATENT DOCUMENTS

| | | | | |
|---|---|---|---|---|
| 5,612,417 A | * | 3/1997 | Rhein | C08L 33/12 525/228 |
| 6,730,733 B2 | | 5/2004 | Overbeek et al. | |
| 7,888,456 B2 | | 2/2011 | Yamamoto et al. | |
| 8,309,670 B2 | * | 11/2012 | Lee | G02B 1/14 526/329.3 |
| 8,399,567 B2 | | 3/2013 | Chun et al. | |
| 8,928,976 B2 | | 1/2015 | Kang et al. | |
| 9,090,721 B2 | | 7/2015 | Sung et al. | |
| 9,422,426 B2 | | 8/2016 | Kwon et al. | |
| 2003/0004271 A1 | | 1/2003 | Faris et al. | |
| 2006/0100391 A1 | * | 5/2006 | Matsumoto | C08L 35/00 525/418 |
| 2010/0202050 A1 | * | 8/2010 | Kang | C08J 5/18 525/77 |
| 2011/0009585 A1 | | 1/2011 | Yonemura et al. | |
| 2011/0226313 A1 | | 9/2011 | Lefebvre et al. | |
| 2013/0314785 A1 | | 11/2013 | Kang et al. | |
| 2014/0000801 A1 | * | 1/2014 | Seo | B29D 11/0073 264/1.6 |
| 2014/0342162 A1 | * | 11/2014 | Sanefuji | B29C 45/14811 428/421 |

FOREIGN PATENT DOCUMENTS

| | | |
|---|---|---|
| CN | 101616940 A | 12/2009 |
| EP | 2065410 A1 | 6/2009 |
| JP | 2009128638 A | 6/2009 |
| JP | 2010001344 A | 1/2010 |
| JP | 2011026563 A | 2/2011 |
| WO | 2009084541 A1 | 7/2009 |
| WO | 2012141453 A2 | 10/2012 |

OTHER PUBLICATIONS

Korean Notice of Preliminary Rejection for Korean Application No. 10-2019-7027500, dated Oct. 26, 2022 with translation, 20 pages.
Chinese Decision on Rejection for Chinese Application No. 201880024370.5, dated Jun. 21, 2022 with translation, 7 pages.
Chinese Office Action for Chinese Application No. 201880024370.5, dated May 31, 2021 with translation, 15 pages.
Chinese Office Action for Chinese Application No. 201880024370.5, dated Feb. 16, 2022 with translation, 25 pages.
European Communication Pursuant to Article 94(3) for European Application No. 18753711.3, dated Oct. 20, 2021, 4 pages.
European Communication Pursuant to Article 94(3) for European Application No. 18753711.3, dated Apr. 5, 2022, 4 pages.
European Communication Pursuant to Rules 70(2) and 70a(2) for European Application No. 18753711.3, dated Jan. 14, 2021, 1 page.
Extended European Search Report for European Application No. 18753711.3, dated Dec. 9, 2020, 8 pages.

(Continued)

*Primary Examiner* — Satya B Sastri
(74) *Attorney, Agent, or Firm* — Buchanan Ingersoll & Rooney PC

(57) ABSTRACT

Acid-functionalized copolymers of methyl methacrylate having relatively high glass transition temperatures and molecular weights may be employed to manufacture articles having high light transmission values, low haze, high heat resistance, and high environmental stability, which are useful as optical protection films, zero-zero optical retardation films, and compensation films as well as lighting pipes and optical imaging lenses.

14 Claims, No Drawings

(56) References Cited

OTHER PUBLICATIONS

Indian Examination Report for Indian Application No. 201917033331, dated Mar. 25, 2021, with translation, 5 pages.
Japanese Notice of Reasons for Refusal for Japanese Application No. 2019-244926, dated Jul. 22, 2022 with translation, 4 pages.
Japanese Notice of Reasons for Rejection for Japanese Application No. 2019-544926, dated Jan. 18, 2022, with translation, 11 pages.
Entire patent prosecution history of U.S. Appl. No. 16/484,837, filed Aug. 9, 2019, entitled, "Acid-Functionalized Copolymers of Methyl Methacrylate and Acrylic Resin Compositions Based Thereon."
Korean Notice of Final Rejection for Korean Application No. 10-2019-7027500, dated Jun. 26, 2023, with English Translation, 8 pages.
European Communication Pursuant to Article 94(3) for European Application No. 18753711.3, dated Jan. 2, 2023, 4 pages.

\* cited by examiner

ACID-FUNCTIONALIZED COPOLYMERS OF METHYL METHACRYLATE AND ACRYLIC RESIN COMPOSITIONS BASED THEREON

This application is a continuation application of U.S. application Ser. No. 16/484,837, filed Aug. 9, 2019, which is a U.S. National Phase Patent Application of International Application No. PCT/US2018/018842, filed Feb. 20, 2018, which claims priority to U.S. Provisional Application No. 62/461,009, filed Feb. 20, 2017, the disclosures of each of which are incorporated herein by reference in their entireties.

FIELD OF THE INVENTION

The invention pertains to high molecular weight, acid-functionalized copolymers of methyl methacrylate which have a desirable combination of properties, including high heat resistance, high transparency, low haze, adjustable optical phase retardation, high environmental stability and/or low moisture uptake.

DISCUSSION OF THE RELATED ART

Conventionally, tri-acetate cellulose (TAC) films have been used in laminates containing $I_2$ stained PVA (polyvinyl alcohol) absorption polarizers. However, it is challenging to fabricate optical polarizers containing TAC/PVA-$I_2$/TAC laminated films that meet the requirements needed under high temperature and high humidity conditions (e.g., 85° C., 85% relative humidity) or for thinner optical polarizers. Additionally, TAC films possess higher intrinsic effective negative optical retardation along the thickness and off-angle directions, which renders such films unsuitable for in-plane switching (IPS) and/or field fringe switching (FFS) liquid crystal display (LCD) applications.

Accordingly, there is a need for materials that can be employed in the manufacture of improved films having tunable birefringence/optical phase retardation properties. Such films are capable of being used as optical protection films, zero-zero retardation films and optical compensation films in optical polarizers for organic light emitting diode (OLED), FFS and IPS LCD devices such as smartphones, tablets, notebooks and LCD televisions with LED lighting units. In addition, the related acrylic materials can also be used in LED lighting pipes, light guide panels, optical imaging lenses, and other types of products.

SUMMARY OF THE INVENTION

The present invention provides acid-functional acrylic copolymers (including ter- and tetra-polymers) with high glass transition temperatures (e.g., $T_g$s of ~115-145° C.) and sufficiently high molecular weight (MW) to render them useful in producing optical grade articles such as optical films, long path-length lighting pipes, thin light guides, optical imaging lenses, and the like. The high Tg acrylic materials may be designed to meet one or more of the requirements of high heat resistance, high light transmission, low haze, lower moisture uptake, excellent dimensional stability, and excellent mechanical properties, optionally with excellent UV resistance. Such acrylic copolymers may possess a refractive index of 1.45-1.53 at a wavelength of 589 nm. The acrylic copolymers may be synthesized using methods such as bulk polymerization, melt polymerization, emulsion polymerization, solution polymerization, and even suspension polymerization. The weight average molecular weight of the acrylic copolymer is higher than 60,000 g/mole, preferably higher than 80,000 g/mole, more preferably higher than 90,000 g/mole, and much more preferably higher than 100,000 g/mole. The Tg value of the acrylic copolymer is higher than 115° C., preferably higher than 120° C., and more preferably higher than 130° C. In addition, selected antioxidants may be combined with the acrylic copolymer to provide an acrylic resin composition having improved thermal stability at high temperatures (e.g., 250-280° C.), such that the acrylic copolymer does not exhibit significant yellowing or bubbling when subjected to such conditions. The loading of the antioxidants in the final resin formulations may be in the range of 0.01 to 4% by weight. UV stabilizers may be used to further improve the UV resistance of the acrylic copolymer at loading levels of 0.1 wt % to 5 wt. % without significant compromise of the optical performance. Toughening agents such as core-shell toughening agent and/or block copolymer toughening agents can also be blended with the high Tg acrylic copolymers to provide acrylic resin compositions having improved mechanical toughness. A 3.2 mm thick plaque prepared with the acrylic copolymers and acrylic resin compositions of the present invention may possess a light transmission value (as measured in accordance with ASTM D1003) of higher than 89% (preferably higher than 91%) and/or exhibit an optical haze value of less than 10% (preferably less than 2%).

Various non-limiting aspects of the present invention may be summarized as follows:

Aspect 1: A copolymer of methyl methacrylate, methacrylic acid and, optionally, at least one additional co-monomer, having a weight average molecular weight of at least 60,000 g/mole and a glass transition temperature of at least 115° C.

Aspect 2: The copolymer of Aspect 1, having a weight average molecular weight of at least 80,000 g/mole.

Aspect 3: The copolymer of Aspect 1, having a weight average molecular weight of at least 90,000 g/mole.

Aspect 4: The copolymer of Aspect 1, having a weight average molecular weight of at least 100,000 g/mole.

Aspect 5: The copolymer of any of Aspects 1 to 4, having a glass transition temperature of at least 120° C.

Aspect 6: The copolymer of any of Aspects 1 to 5, having a glass transition temperature of at least 130° C.

Aspect 7: The copolymer of any of Aspects 1 to 6, having a refractive index of 1.45-1.53 at a wavelength of 589 nm.

Aspect 8: The copolymer of any of Aspects 1 to 7, wherein the at least one additional co-monomer is selected from the group consisting of ethyl acrylate, methyl acrylate, styrene, alpha-methyl styrene, cyclic and aliphatic unsaturated anhydrides, benzyl methacrylate, cyclohexyl methacrylate, tert-butyl cyclohexyl methacrylate, tert-butyl methacrylate and combinations thereof.

Aspect 9: The copolymer of any of Aspects 1 to 8, wherein the copolymer is selected from the group consisting of methyl methacrylate/methacrylic acid copolymers, methyl methacrylate/methacrylic acid/ethyl acrylate copolymers, methyl methacrylate/methacrylic acid/methyl acrylate copolymers, methyl methacrylate/methacrylic acid/t-butyl cyclohexyl methacrylate copolymers, methyl methacrylate/methacrylic acid/isobornyl methacrylate copolymers, methyl methacrylate/methacrylic acid/styrene copolymers, methyl methacrylate/methacrylic acid/styrene/maleic anhydride copolymers, methyl methacrylate/methacrylic acid/maleic anhydride/alpha-methyl styrene copolymers, methyl methacrylate/methacrylic acid/t-butyl cyclohexyl methacrylate copolymers/ isobornyl methacrylate copolymers, methyl methacrylate/methacrylic acid/isobornyl methacrylate/benzyl methacrylate copolymers, methyl methacrylate/methacrylic acid/benzyl methacrylate/t-butyl cyclohexyl methacrylate copolymers, methyl methacrylate/methacrylic acid/t-butyl cyclohexyl methacrylate/tert-butyl methacrylate copolymers and combinations thereof.

Aspect 10: The copolymer of any of Aspects 1 to 9, wherein methacrylic acid comprises from about 1 to about 7 weight % of the copolymer.

Aspect 11: The copolymer of any of Aspects 1 to 10, wherein methyl methacrylate comprises from about 70 to about 99 weight % of the copolymer.

Aspect 12: The copolymer of any of Aspects 1 to 10, wherein the copolymer is comprised of about 79 to about 99% by weight methyl methacrylate, about 1 to about 7% by weight methacrylic acid and 0 to about 20% by weight in total of at least one additional co-monomer.

Aspect 13: The copolymer of any of Aspects 1 to 12, wherein the copolymer has a light transmission of at least about 88% and less than 10% haze when measured by ASTM D1003 on a 3.2 mm thick plaque.

Aspect 14: The copolymer of any of Aspects 1 to 12, wherein the copolymer has a light transmission of at least about 90% and less than 5% haze when measured by ASTM D1003 on a 3.2 mm thick plaque.

Aspect 15: The copolymer of any of Aspects 1 to 14, wherein the copolymer has a melt flow rate of about 0.3 to about 2.5 g/10 minutes at 230° C. under 3.8 kg.

Aspect 16: An acrylic resin composition, comprising at least one copolymer in accordance with any of Aspects 1 to 15 and at least one antioxidant.

Aspect 17: An acrylic resin composition, comprising at least one copolymer in accordance with any of Aspects 1 to 16 and at least one antioxidant selected from the group consisting of phosphite antioxidants, phosphate antioxidants, phosphonate antioxidants, phosphine antioxidants, phenolic antioxidants, triazinetrione antioxidants and combinations thereof.

Aspect 18: An acrylic resin composition, comprising at least one copolymer in accordance with any of Aspects 1 to 17 and at least one UV stabilizer.

Aspect 19: An acrylic resin composition, comprising at least one copolymer in accordance with any of Aspects 1 to 18 and at least one UV stabilizer selected from the group consisting of benzophenone UV stabilizers, benzotriazole UV stabilizers, hydroxyphenyl benzotriazole UV stabilizers, hydroxyphenyl triazine UV stabilizers, benzoxazinone UV stabilizers and combinations thereof.

Aspect 20: An acrylic resin composition, comprising at least one copolymer in accordance with any of Aspects 1 to 19 and at least one toughening agent.

Aspect 21: An acrylic resin composition in accordance with Aspect 20, wherein the at least one toughening agent comprises at least one toughening agent selected from the group consisting of block copolymer toughening agents (in particular, a block copolymer toughening agent selected from the group consisting of di-block and tri-block copolymers which contain a polyacrylate soft block and one or two polymethylmethacrylate and/or polystyrene hard blocks) and core-shell toughening agents.

Aspect 22: An acrylic resin composition, comprising at least one copolymer in accordance with any of Aspects 1 to 21 and at least one additional polymer selected from the group consisting of copolymers of methyl methacrylate and one or more C1-C4 alkyl esters of acrylic acid.

Aspect 23: The acrylic resin composition of Aspect 22, wherein the at least one additional polymer is a copolymer of methyl methacrylate and at least one comonomer selected from ethyl acrylate or methyl acrylate.

Aspect 24: The acrylic resin composition of Aspect 22 or 23, wherein the acrylic resin is comprised of from about 25% by weight to about 99.9% by weight of copolymer and from 0.1% by weight to about 75% by weight of additional polymer, based on the total weight of copolymer and additional polymer.

Aspect 25: The acrylic resin composition of any of Aspects 22 to 24, wherein the at least one additional polymer has a weight average molecular weight of at least 100,000 g/mole.

Aspect 26: The acrylic resin composition of any of Aspects 22 to 24, wherein the at least one additional polymer has a weight average molecular weight of at least 120,000 g/mole.

Aspect 27: An acrylic resin composition comprising at least one copolymer in accordance with any of Aspects 1 to 26, wherein anhydride ring structures are present.

Aspect 28: The acrylic resin composition of Aspect 27, containing 0.5 to 2% by weight anhydride ring structures as measured by $^{13}C$ NMR.

DETAILED DESCRIPTION OF CERTAIN EMBODIMENTS OF THE INVENTION

The acid-functionalized acrylic copolymers of the present invention are useful for the preparation of acrylic resin compositions having a Tg of at least about 115° C. (in other embodiments, a Tg of at least 115° C., at least 120° C., at least 125° C. or at least 130° C.; in certain embodiments, the Tg of the acrylic resin composition is not greater than 140° C. or not greater than 135° C.) and a weight average molecular weight of at least about 60,000 g/mole (in other embodiments, a weight average molecular weight of at least 60,000 g/mole, at least 70,000 g/mole, at least 80,000 g/mole, at least 90,000 g/mole, at least 95,000 g/mole, or at least 100,000 g/mole). In other embodiments, the acrylic resin composition has a weight average molecular weight not greater than 250,000 g/mole or not greater than 200,000 g/mole. Such an acrylic resin composition may be comprised of a) at least one copolymer of methyl methacrylate, methacrylic acid and, optionally, at least one additional co-monomer (hereafter referred to as the "copolymer of methyl methacrylate and methacrylic acid" or "the acid-functionalized acrylic copolymer"), and, optionally, b) at least one additional polymer selected from the group consisting of copolymers of methyl methacrylate and one or more C1-C4 alkyl esters of acrylic acid (hereafter referred to as the "optional additional polymer"). The acrylic resin composition prepared using the acid-functionalized acrylic copolymer may have a light transmission of at least about 88% or at least about 90% and less than about 10% haze or less than about 5% haze (as measured on a plaque of the acrylic resin composition having a thickness of 3.2 mm, in accordance with ASTM D1003), making it especially suitable for fabrication of optical films, light guides, and the like. The acrylic resin composition may additionally comprise at least one antioxidant, such as an antioxidant selected from the group consisting of phosphite antioxidants, phosphate antioxidants, phosphonate antioxidants, phosphine antioxidants, phenolic antioxidants, triazinetrione antioxidants and combinations thereof.

Analytical Test Methods

The test methods used to measure parameters and characteristics of the copolymers and acrylic resin compositions in accordance with the present invention, such as glass transition temperature (Tg), weight average molecular weight, % light transmission and % haze, are set forth in the Examples.

Copolymer(s) of Methyl Methacrylate and Methacrylic Acid (Acid-Functionalized Acrylic Copolymer)

As previously mentioned, one aspect of the present invention provides at least one copolymer of methyl methacrylate, methacrylic acid and, optionally, at least one additional co-monomer (which may be referred to herein as the "copolymer of methyl methacrylate and methacrylic acid" or the "acid-functionalized acrylic copolymer"). In a preferred embodiment of the invention, the copolymer of methyl methacrylate and methacrylic acid is a random (statistical copolymer). In another preferred embodiment, the copolymer of methyl methacrylate and methacrylic acid is a linear (non-branched) copolymer.

The at least one copolymer of methyl methacrylate and methacrylic acid may, for example, be advantageously selected from the group consisting of methyl methacrylate/methacrylic acid copolymers, methyl methacrylate/methacrylic acid/ethyl acrylate copolymers, methyl methacrylate/methacrylic acid/methyl acrylate copolymers, methyl methacrylate/methacrylic acid/t-butyl cyclohexyl methacrylate copolymers, methyl methacrylate/methacrylic acid/isobornyl methacrylate copolymers, methyl methacrylate/methacrylic acid/styrene copolymers, methyl methacrylate/methacrylic acid/styrene/maleic anhydride copolymers, methyl methacrylate/methacrylic acid/maleic anhydride/alpha-methyl styrene copolymers, methyl methacrylate/methacrylic acid/ethyl acrylate/benzyl methacrylate copolymers, methyl methacrylate/methacrylic acid/benzyl methacrylate/t-butyl cyclohexyl methacrylate copolymers, methyl methacrylate/methacrylic acid/t-butyl cyclohexyl methacrylate copolymers/isobornyl methacrylate copolymers, methyl methacrylate/methacrylic acid/benzyl methacrylate/isobornyl methacrylate copolymers, methyl methacrylate/methacrylic acid/alpha-methylstyrene/n-butyl acrylate copolymers, methyl methacrylate/methacrylic acid/styrene/alpha-methylstyrene copolymers, methyl methacrylate/methacrylic acid/t-butyl cyclohexyl methacrylate/benzyl methacrylate copolymers, methyl methacrylate/methacrylic acid/isobornyl methacrylate/tert-butyl methacrylate copolymers and combinations thereof.

Methacrylic acid (i.e., repeating units resulting from polymerization of methacrylic acid) may, in certain embodiments, comprise at least about 0.5 weight % of the copolymer and/or not more than about 10 weight % of the copolymer, e.g., from about 1 to about 7 weight % of the copolymer. According to other embodiments, methyl methacrylate (i.e., repeating units resulting from polymerization of methyl methacrylate) may comprise at least about 50 weight % and/or not more than about 99.5 weight %, e.g., from about 80 to about 99 weight %, of the copolymer. The copolymer may, in various embodiments of the invention, be comprised of about 79 to about 99% by weight methyl methacrylate, about 1 to about 7% by weight methacrylic acid and 0 to about 20% by weight in total of at least one additional co-monomer.

The optional additional co-monomer or co-monomers used to make the copolymer may be any comonomer or comonomers capable of being copolymerized with the methyl methacrylate and methacrylic acid, but in preferred embodiments is or are a vinyl aromatic monomer and/or a (meth)acrylate monomer, such as (but not limited to) methyl acrylate, ethyl acrylate, styrene, cyclic and aliphatic unsaturated anhydrides (such as maleic anhydride), alpha-methyl styrene, cyclohexyl methacrylate, tert-butyl cyclohexyl methacrylate, tert-butyl methacrylate, n-butyl acrylate, benzyl methacrylate and combinations thereof. Acrylic acid and other alpha-beta unsaturated carboxylic acid monomers may also be employed. Other useful comonomers include vinyl ester, such as neodecanoate and vinyl neononanate. Generally speaking, it will be desirable to utilize additional co-monomers that contain only a single polymerizable group (e.g., a carbon-carbon double bond) per molecule.

Particular illustrative examples of acid-functionalized acrylic copolymers in accordance with the present invention include the following copolymers:

A copolymer consisting of methyl methacrylate (92 to 98.5 weight %) and methacrylic acid (1.5 to 8 weight %).

A copolymer consisting of methyl methacrylate (70 to 80 weight %), methacrylic acid (1 to 3 weight %), alpha-methylstyrene (20 to 25 weight %) and n-butyl acrylate (0.5 to 2 weight 0%).

A copolymer consisting of methyl methacrylate (94 to 98 weight %, e.g., 96 weight %), methacrylic acid (1.0 to 4.5 weight %, e.g., 3 weight %) and benzyl methacrylate (0.5 to 4 weight %, e.g., 1 weight %).

A copolymer consisting of methyl methacrylate (84 to 94 weight %), methacrylic acid (2 to 6 weight %) and styrene (2 to 10 weight %).

A copolymer consisting of methyl methacrylate (92 to 96 weight %, e.g., 94 weight %), methacrylic acid (2 to 4 weight %, e.g., 3 weight %), styrene (1 to 3 weight %) and, optionally, alpha-methylstyrene (0 to 2 weight %).

A copolymer consisting of methyl methacrylate (92 to 96 weight %, e.g., 94 weight %), methacrylic acid (2 to 4 weight %, e.g., 3 weight %), optionally, ethyl acrylate (0-1 weight %) and, optionally, isobornyl methacrylate (0-5 weight %).

A copolymer consisting of methyl methacrylate (92 to 96 weight %, e.g., 94%), methacrylic acid (1 to 4 weight %, e.g., 3 weight %), optionally, ethyl acrylate (0 to 1 weight %) and, optionally, tert-butyl cyclohexyl methacrylate (0 to 5 weight %).

A copolymer consisting of methyl methacrylate (92 to 96 weight %, e.g., 94 weight %), methacrylic acid (1 to 4 weight %, e.g., 3 weight %), optionally, ethyl acrylate (0 to 1weight %) and, optionally, tert-butyl methacrylate (0 to 5 weight %).

The acid-functionalized acrylic copolymers may be prepared by adaptation of any of the techniques known in the polymer art for the copolymerization of acrylic and other ethylenically unsaturated monomers such as bulk polymerization, melt polymerization, emulsion polymerization, solution polymerization, and suspension polymerization. For example, in a bulk copolymerization, a monomer mixture containing methyl methacrylate, methacrylic acid and any other comonomers desired to be incorporated as part of the target acid-functionalized acrylic copolymer may be charged to a suitable polymerization vessel and polymerization initiated using a suitable initiator or combination of initiators, such as a free radical initiator (e.g., a peroxide compound). One or more chain transfer agents, such as a mercaptan and/or disulfide, may additionally be present. The polymerization reaction mixture is then heated for a time and at a temperature effective to accomplish the desired degree of conversion, with any unreacted monomer(s) then being removed from the copolymer product by any suitable means such as volatilization.

The copolymer obtained may be compounded with one or more other components (e.g., additional polymer, toughening agent (e.g., block copolymer toughening agent, core-shell toughening agent), UV stabilizer and/or antioxidant) to obtain an acrylic resin composition, using any suitable method such as extrusion.

Acrylic Resin Compositions

Acrylic resin compositions containing the above-described copolymers of methyl methacrylate and methacrylic acid constitute other aspects of the present invention. Such acrylic resin compositions may comprise, in addition to one or more of the copolymers of methyl methacrylate and methacrylic acid, one or more of the following types of additional components, such as additional polymers, antioxidants, toughening agents (such as block copolymer and core-shell toughening agents), and/or UV stabilizers.

Optional Additional Polymer(s)

As previously mentioned, in certain embodiments of the invention at least one additional polymer is present in the acrylic resin composition in addition to the acid-functionalized acrylic copolymer. The additional polymer may be selected from the group consisting of copolymers of methyl methacrylate and one or more C1-C4 alkyl esters of acrylic acid. The additional polymer is different from the copolymer of methyl methacrylate and methacrylic acid in that it does not contain methacrylic acid. Accordingly, the additional polymer may consist essentially of or consist of polymerized units of methyl methacrylate and one or more C1-C4 alkyl esters of acrylic acid (C1-C4 alkyl acrylates). In a preferred embodiment of the invention, the additional polymer is a random (statistical copolymer). In another preferred embodiment, the additional polymer is a linear (non-branched) copolymer.

For example, the at least one additional polymer may be a copolymer of methyl methacrylate and at least one comonomer selected from ethyl acrylate or methyl acrylate.

In preferred embodiments of the invention, the at least one additional polymer may have a weight average molecular weight of at least 100,000 g/mole, at least 110,000 g/mole, at least 120,000 g/mole or at least 130,000 g/mole. In certain embodiments, the weight average molecular weight of the at least one additional polymer is not greater than 250,000 g/mole or not greater than 200,000 g/mole.

The additional polymer can be obtained through any polymerization method known in the art, such as melt polymerization, solution polymerization, emulsion polymerization, and even suspension polymerization.

The additional polymer is not a required ingredient in the acrylic resin composition of the present invention. Accordingly, in certain embodiments of the invention the acrylic resin composition is comprised of from about 25% by weight to 100% by weight of the copolymer(s) of methyl methacrylate and methacrylic acid and from 0% to about 75% by weight of the additional polymer(s), based on the total weight of a) and b).

The polymer or polymers used in the acrylic resin composition are, in a preferred embodiment, selected to provide an acrylic resin composition having a melt flow rate of about 3 to about 25 g/10 minutes at 240° C. under 10 kg.

In certain embodiments of the invention, anhydride ring structures are present in the acrylic resin composition. For example, the acrylic resin composition may contain 0.5 to 2% by weight anhydride ring structures, as measured by $^{13}$C NMR. Such anhydride ring structures may be incorporated into one or both of the copolymer of methyl methacrylate and methacrylic acid or the additional polymer by the use of one or more anhydride-containing comonomers (particularly anhydride-functionalized monomers containing carbon-carbon double bonds such as maleic anhydride) during polymerization. Anhydride ring structures may also be incorporated in post-polymerization by grafting or other polymer derivatization methods known in the art.

Antioxidants

The acrylic resin composition may contain one or more antioxidants. In one embodiment, where the weight average molecular weight of the polymeric component of the acrylic resin composition is less than 90,000 g/mole, at least one antioxidant in present in the acrylic resin composition. Suitable antioxidants include antioxidants selected from the group consisting of phosphite antioxidants, phosphate antioxidants, phosphonate antioxidants, phosphine antioxidants, phenolic antioxidants (in particular, sterically hindered phenolic antioxidants), triazinetrione antioxidants and combinations thereof.

Examples of suitable sterically hindered phenolic antioxidants include, but are not limited to, pentaerythritol tetrakis (3-(3,5-di-tert-butyl-4-hydroxyphenyl)propionate) (sold by BASF under the product name Irganox® 1010), octadecyl 3-(3,5-di-tert-buty-4-hydroxyphenyl)propionate (sold by BASF under the product name Irganox® 1076), and triethylene glycol bis(3-tert-butyl-4-hydroxy-5-methylphenyl) propionate (sold by BASF under the product name Irganox® 245). Examples of suitable phosphite antioxidants include, but are not limited to, pentaerythritol diphosphites, such as those described in U.S. Pat. Nos. 5,364,895 and 5,438,086 (the disclosure of each of which is incorporated herein by reference in its entirety for all purposes), bis-(2,4-di-t-butylphenol) pentaerythritol diphosphite (sold by BASF under the product name Irgafos® 126), tris(2,4-di-tert-butylphenyl) phosphite (sold by BASF under the product name Irgafos® 168), and bis(2,4-dicumylphenyl) pentaerythritol diphosphate (sold by Dover Chemical Corporation under the product name DoverPhos® S-9228).

In various embodiments of the invention, the acrylic resin composition comprises from about 150 ppm to about 4500 ppm or from about 0.015 to 0.45% by weight in total of antioxidant.

Other Additives

The acrylic resin composition may optionally comprise one or more additives in addition to the various ingredients mentioned above. Suitable types of additional optional additives include, but are not limited to, fillers, coloring agents, pigments, lubricants, processing aids, toughening agents, and antistatic agents, provided such additives are not present in amounts which interfere with the ability to obtain acrylic resin compositions having the desired transparency, clarity and heat resistance characteristics.

In one embodiment, the acrylic resin composition additionally comprises at least one UV stabilizer. Suitable UV stabilizers may, for example, be selected from the group consisting of benzophenone UV stabilizers, benzotriazole UV stabilizers, hydroxyphenyl benzotriazole UV stabilizers, hydroxyphenyl triazine UV stabilizers, benzoxazinone UV stabilizers and combinations thereof. Particular examples of suitable UV stabilizers include, but are not limited to, 2-(2H-benzotriazol-2-yl)-4,6-bis(1-methyl-1-phenylethyl) phenol (sold by BASF under the product name Tinuvin® 234), 2-(4,6-diphenyl-1,3,5-triazine-2-yl)-5-[(hexyl)oxy] phenol (sold by BASF under the product name Tinuvin®

1577), and phenol, 2,2'-methylene-bis(6-(2H-benzotriazol-2-yl)-4-(1,1,3,3-tetramethyl-butyl)) (sold by BASF under the product name Tinuvin® 360, as well as combinations thereof. In certain embodiments, the acrylic resin composition is comprised of from about 0.1 weight % to about 5 weight % in total of UV stabilizer.

In another embodiment, the acrylic resin composition is additionally comprised of at least one toughening agent (sometimes also referred to as impact modifiers). The choice of toughening agent is not limited and may include block copolymer as well as core-shell toughening agents. Suitable block copolymer toughening agents include, for example, block copolymers selected from the group consisting of di-block and tri-block copolymers which contain a polyacrylate soft block and one or two polymethylmethacrylate and/or polystyrene hard blocks. Typically, such block copolymers may comprise from about 20 to about 40 weight % poly(butyl acrylate) blocks. Block copolymer toughening agents suitable for use in the present invention are available, for example, from Arkema under the brand name "Nanostrength".

Any of the various types of core-shell toughening agents known in the art may be employed. The core-shell toughening agent may be in the form of fine particles having an elastomer core and at least one thermoplastic shell, the particle size being generally less than 1 micron and advantageously between 50 and 500 nm, and preferably from 100 nm to 450 nm. The core-shell toughening agents typically are copolymers that may be monodisperse or polydisperse. By way of example of the core, mention may be made of isoprene homopolymers or butadiene homopolymers, copolymers of isoprene with at most 3 mol % of a vinyl monomer and copolymers of butadiene with at most 35 mol % of a vinyl monomer, and preferable 30 mol % or less. The vinyl monomer may be styrene, an alkylstyrene, acrylonitrile or an alkyl(meth)acrylate. Another core family consists of the homopolymers of an alkyl (meth)acrylate and the copolymers of an alkyl(meth)acrylate with at most 35 mol % of a vinyl monomer, and preferable 30 mol % or less. The alkyl(meth)acrylate is advantageously butyl acrylate. The vinyl monomer may be styrene, an alkylstyrene, acrylonitrile, butadiene or isoprene. The core of the copolymer may be completely or partly crosslinked. All that is required is to add at least difunctional monomers during the preparation of the core; these monomers may be chosen from poly(meth)acrylic esters of polyols, such as butylene di(meth)acrylate and trimethylolpropane trimethacrylate. Other difunctional monomers are, for example, divinylbenzene, trivinylbenzene, vinyl acrylate and vinyl methacrylate. The core can also be crosslinked by introducing into it, by grafting or as a comonomer during the polymerization, unsaturated functional monomers such as anhydrides of unsaturated carboxylic acids, unsaturated carboxylic acids and unsaturated epoxides. Mention may be made, by way of example, of maleic anhydride, (meth)acrylic acid and glycidyl methacrylate.

The shell(s) may be, for example, styrene homopolymers, alkylstyrene homopolymers or methyl methacrylate homopolymers, or copolymers comprising at least 70 mol % of one of the above monomers and at least one comonomer chosen from the other above monomers, vinyl acetate and acrylonitrile. The shell may be functionalized by introducing into it, by grafting or as a comonomer during the polymerization, unsaturated functional monomers such as anhydrides of unsaturated carboxylic acids, unsaturated carboxylic acids and unsaturated epoxides. Mention may be made, for example, of maleic anhydride, (meth)acrylic acid and glycidyl methacrylate. By way of example, mention may be made of core-shell copolymers (A) having a polystyrene shell and core-shell copolymers (A) having PMMA shell. The shell could also contain functional or hydrophilic groups to aid in dispersion and compatibility with different polymer phases. There are also core-shell copolymers (A) having two shells, one made of polystyrene and the other, on the outside, made of PMMA. Advantageously, the core represents, by weight, 70 to 90% of the core-shell polymer, and the shell represents 30 to 10%.

If a toughening agent is to be included in the acrylic resin composition, it is preferably selected to be one that provides an acrylic resin composition having high optical clarity, high impact resistance and/or high mechanical toughness/ductility.

Uses for the Acid-Functionalized Acrylic Copolymer and Acrylic Resin Compositions While the acid-functionalized acrylic copolymers and acrylic resin compositions containing such acid-functionalized acrylic copolymers are generally useful for any end-use application employing a thermoplastic material, they are especially for use in the manufacture of films as described in more detail below.

Articles Prepared Using the Acrylic Copolymers and Acrylic Resin Compositions

The acid-functionalized acrylic copolymers and acrylic resin compositions of the present invention are thermoplastic materials which may be shaped or formed by any suitable technique known in the plastics art into articles of any desired geometry, including, for example, sheets, rods, tubes, films, molded parts, laminates and the like.

Films prepared using the acid-functionalized acrylic copolymers and acrylic resin compositions of the present invention may be formulated and fabricated so as to have a light transmission of at least about 88% and less than about 10% haze. In other advantageous embodiments, the film has a light transmission of at least 95%, at least 92% or even greater. In additional embodiments, the film has less than 0.5% haze or less than 0.2% haze.

Stretched films, in particular bi-axially and/or uni-axially stretched films, may be prepared using the acid-functionalized acrylic copolymers and acrylic resin compositions of the present invention. Prior to being bi-axially stretched, the film may have, for example, a thickness of from about 60 to about 500 microns, for example. After being bi-axially stretched, the film may have a thickness of about 10 to about 200 microns or about 15 to about 80 microns, for example.

The optical films may possess glass transition temperatures of greater than or equal to 120° C., measured at a heating rate of 10° C./minute in DSC in $N_2$, or a Tg greater than or equal to 125° C. The refractive index values may be controlled within a range of 1.49-1.53 at a wavelength of 589 nm. The in-plane and out-of-plane retardation values in the zero-zero retardation films are controlled at or below 10 nm per equivalent 100 um. The tensile strength and modulus are above 70 MPa and 3 GPa while the tensile elongation is preferably over 7%, more preferably over 10%. There is no obvious stress whitening during the film lamination processes. The optical films possess better moisture resistance and environmental stability. In addition, the acid-functionalized acrylic copolymers and acrylic resin compositions of the present invention have other potential applications in lighting pipes, optical imaging lens, optical compensation films and so on.

Optical imaging lenses and light pipes can be made in an injection molding unit (such as the injection molding units manufactured by Sumitomo) wherein the acid-functionalized acrylic copolymers and acrylic resin compositions of the present invention are heated at a barrel temperature of 220-260° C., optionally under $N_2$ protection. The light guide panels can be produced in melt extrusion or injection molding at elevated temperature. Before the melt processing, the resins preferably are dried sufficiently in a desiccator oven at a temperature about 20° C. below the Tg of the resin.

Methods of Making Articles

Suitable methods for forming the compositions of the present invention into useful articles include, but are not limited to, extrusion, injection molding, blow molding, compression molding, vacuum forming, rotational molding, solution casting and the like and combinations thereof.

In certain embodiments of the invention, a film is fabricated from the acid-functionalized acrylic copolymer or acrylic resin composition by an extrusion (melt casting) or solution casting method.

In a first step of an extrusion method for forming a film, an acrylic resin composition as described above may be supplied to an extruder such as a mini-cast film line, operating with set point temperatures, extruder screw speed, extruder die gap settings and extruder back pressure sufficient to convert the charged material from a solid (e.g. granular or pellet) state to a molten state. The extrusion process may typically be carried out at a temperature in the range of 240° C. to 280° C., preferentially under an inert gas such as nitrogen. The incorporation of one or antioxidants in the acrylic resin composition may be advisable to avoid material degradation at higher processing temperatures.

The molten material is subsequently transferred e.g. by means of a gear pump to a film forming die, which can be any conventional film forming die, such as a "T-die" or a "coat hanger die", and extruded from the die onto a support. A film is then formed upon cooling by solidification of the cast material on the support, which is preferably made of a material capable of sustaining the temperature of the cast melt without deformation or deterioration by chemical reaction. The film may be stripped off from the support for further processing once solidification has progressed to the point that the film has self-supporting properties. In particular, the film may preferably be subjected to a subsequent film orientation treatment by mechanical stretching under the conditions set forth below. The mechanical stretching can be carried out before or after the completion of cooling in the film formation process.

Following extrusion or casting, the resulting film may be uniaxially or biaxially stretched. For example, the film may be subjected to a stretching step wherein the film may be stretched either uniaxially in machining or transverse direction or stretched biaxially in machining and transverse direction. In the case of the biaxial stretching, the film can be stretched in two directions simultaneously or sequentially, i.e. in machining direction followed by transverse direction, or vice versa. Orientation in a single direction (e.g. machine direction) yields a uniaxially oriented film. Similarly, orientation in two directions (e.g. machine direction and transverse direction), whether conducted simultaneously or as two separate steps, yields a biaxially oriented film.

Uniaxial or biaxial stretching can be carried out using a conventional tenter, e.g., a pin tenter, a clip tenter or a biaxial stretching tenter. If the film is on a support, the support must be sufficiently flexible to allow for effective stretching and has to sustain the mechanical stretching operation without rupture.

The stretching may, for example, be carried out at a temperature in the range of $T_g-20°$ C. to $T_g+40°$ C., e.g., in the range of $T_g-10°$ C. to $T_g+35°$ C., or in the range of $T_g-5°$ C. to $T_g+30°$ C., wherein $T_g$ refers to the glass transition temperature of the resin component the film is made of.

The stretching ratio is defined as the ratio $L_s/L_0$, wherein $L_s$ represents the length of the film in the stretching direction after stretching and $L_0$ defines the length of the film in the stretching direction before stretching. The stretching ratio may preferably be in the range of from 1.05 times to 6.0 times, or from 1.1 times to 4.0 times, or from 1.25 times to 3.0 times.

The film stretching speed, which refers to the percentage elongation $(L_s-L_0)/L_0 \times 100\%$ in either machining direction or transverse direction per unit of time, may be, for example, from 0.01%/sec to 200%/sec, from 0.1%/sec to 50%/sec, or from 0.5%/sec to 10%/sec.

The stretching may be carried out in a single step or multiple steps, wherein the stretching conditions can be the same or different among the steps, but in any case fall within the range of conditions as specified above for each individual step. Each stretching step, may optionally further include a heat setting step wherein the stretched film is held under tension at a temperature in the range of, for example, near or above the glass transition temperature of the copolymer or the acrylic resin composition for a period of time in the range of, for example, from one second to three minutes.

In yet another embodiment, a film may be produced by a solution casting or coating method. Such methods are especially useful for forming films which are relatively thin, i.e., films having a thickness less than that readily achievable through extrusion/biaxial stretching techniques. Any of the solution casting or coating methods known in the art may be adapted for use in the present invention. For example, the acrylic resin composition may be dissolved in a suitable volatile solvent or combination of volatile solvents and the resulting solution applied as a layer to a surface of a suitable substrate. The applied layer may then be subjected to a drying step, wherein solvent is removed by an appropriate method such as heating and/or application of a vacuum. The resulting film may then be separated from the substrate (and optionally stretched, as described above) or left on the substrate, as may be appropriate for the particular desired end-product.

Uses for Formed Articles

Articles prepared using the copolymers and acrylic resin compositions of the present invention may find utility in any of a number of industries, including for example the optics industry, transportation industry, electronics industry, machinery industry, appliance industry, container industry, building and construction industry, medical and healthcare industry, sports and leisure industry, wire and cable industry or the like, particularly end-uses in which the various properties of the copolymers and acrylic resin compositions (e.g., high heat resistance, high transparency, low haze, adjustable optical phase retardation, high environmental stability and/or low moisture uptake) are considered to be desirable or advantageous.

For example, films prepared from the acid-functionalized acrylic copolymers or acrylic resin compositions of the present invention can be used for the production of optical grade products for which a high degree of transparency is desirable and is maintained under mechanical stress within a wide temperature range.

Films comprising the acid-functionalized acrylic copolymer or acrylic resin composition, obtained by solution casting, melt casting or any other film formation process and irrespective of being "unoriented" or "oriented", may be further laminated to other optical films to form a composite film structure. Particular examples of those film structures include, but are not limited to, polarizing plates, positive and negative biaxial plates, positive and negative C-plates, and negative wavelength dispersion plates.

The films thereby obtained are amorphous, highly transparent and of low haze exhibiting adjustable birefringent/phase retardation properties, long-term durability, good mechanical stability and compatibility with other materials commonly used in manufacturing optical elements. They are thus considered as useful for optical compensation and for the production of optical elements for manipulation of the polarization state of light.

The films prepared from the acid-functionalized acrylic copolymer or acrylic resin composition of the present invention may thus be utilized in a polarizing plate comprising a polarizer and two transparent protective films disposed on both sides thereof, wherein at least one of the protective films is a film comprising the acid-functionalized acrylic copolymer or acrylic resin composition.

The polarizer may be, for example, an iodine-based polarizer, a dye-based polarizer using dichroic dye, or a polyene based polarizer. Iodine- and dye-based polarizers are typically produced from a PVA-based film, wherein the production process comprises doping a PVA-based film, uniaxial stretching the film, an optional fixing treatment, and drying. The PVA-based film is typically obtained by casting a solution or melt comprising a polymer that has been obtained by polymerization of vinyl ester monomers (possibly using other ethylenically unsaturated compounds as co-monomers) and subsequent saponification of the ester functions. Doping of the film may be carried out prior to uniaxial stretching, during it or thereafter. Doping may be achieved, for example, by immersing the PVA-based film in a solution comprising iodine-potassium iodide and/or dichroic dye(s), which are absorbed by the film or alternatively by blending these dopants during the stage of film casting. The uniaxial stretching may be conducted as a wet process, wherein the film is stretched in a warm or hot (30-90° C.) aqueous bath, which may be a solution comprising the above dopants, or as a dry process stretching the film in air or an inert gas atmosphere at a temperature in the range of, for example, from 50 to 180° C. The stretching ratio is typically at least 4.0 times. The mechanical stretching imparts a unidirectional orientation to the iodine-doped PVA-based film, which is responsible for the film's polarizing effect. Typically, the polarizer has a thickness in the range of from 10 to 40 μm, or from 15 to 30 μm, after stretching. In a fixation treatment, a crosslinking of the material the film is made of is carried out; this may, for example, be conducted by contacting the film with a boric acid solution. Drying of the polarizer is typically accomplished at a temperature in the range of, for example, from 30 to 150° C.

The polarizing plate may comprise transparent protective films other than the optical retardation films comprising acid-functionalized acrylic copolymer or acrylic resin composition according to the present invention. These other transparent protective films are not particularly limited and may, for example, be cellulose acylate films such as TAC films, which are commercially available. The method by which a film comprising acid-functionalized acrylic copolymer or acrylic resin composition according to the present invention and/or the other transparent protective films can be applied to the polarizer to form the polarizing plate is not particularly limited. They may, for example, be directly laminated or stuck onto the polarizer.

Optionally, additional other functional films may be applied between the polarizer and one or both of the protective films or on top of one or both of the protective films, wherein one or both of the protective films can be a film comprising acid-functionalized acrylic copolymer or acrylic resin composition according to the present invention. The other functional films may include, without being limiting, an anti-reflection film, a light scattering film, a transparent hard coat, an antistatic film, an adhesive film, a UV absorption film or a polarizing film.

If needed, an adhesive (in particular a pressure sensitive or hot melt adhesive) or a tie layer could be employed to facilitate bonding between any two of the previously mentioned films, i.e., the polarizer, a protective film (which could be a film comprised of an acid-functionalized acrylic copolymer or acrylic resin composition in accordance with the present invention or a different type of protective film), and one of the other functional films. UV curable acrylic adhesives, containing multifunctional acrylic urethanes and their blends with other multifunctional acrylic resins (which typically contain multiple (meth)acrylate functional groups capable of being reacted/polymerized by exposure to UV light), are preferably used to laminate a PVA film over acrylic optical films during on-line film lamination processes.

Such a film or a polarizing plate comprising at least one such film may be used in a LCD display device. In one aspect, the present invention thus relates to a liquid crystal display or an imaging device comprising a film comprised of an acid-functionalized acrylic copolymer or acrylic resin composition in accordance with the present invention as set forth above. Such a liquid crystal display typically comprises a liquid crystal cell and two polarizing plates, one disposed on each of the two sides of the liquid crystal cell, wherein at least one of the polarizing plates comprises at least one film comprised of an acid-functionalized acrylic copolymer or acrylic resin composition according to the invention. For example, a film comprising an acid-functionalized acrylic copolymer or acrylic resin composition according to the invention may be used on the side of the polarizing plate facing the liquid crystal. Acrylic optical phase retardation films include zero-zero retardation films, C-plates, quarter-wavelength plates and half-wavelength plates.

Other suitable end-uses for films comprised of acid-functionalized acrylic copolymer or acrylic resin composition in accordance with the present invention include, but are not limited to, DVD production, insert molding, use as an outer layer in a flat panel display or LED, membrane switches, decals or transfer films, instrument panels and smart cards. In one embodiment, graphic designs may be printed onto a film comprising or made from an acid-functionalized acrylic copolymer or acrylic resin composition in accordance with the invention and the printed film applied to a substrate. A film comprised of acid-functionalized acrylic copolymer or acrylic resin composition in accordance with the invention can be applied to a surface of a substrate by lamination or the use of an adhesive or tie layer, for example. Films containing acid-functionalized acrylic polymers can offer better adhesion to a PVA layer.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element that does not materially affect the basic and novel characteristics of the acid-functionalized acrylic copolymer or acrylic resin composition of the present invention. Additionally, in some embodiments, the invention can be construed as excluding any element not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Testing Methods:
- Melt flow rate (MFR) measurement: Instron Ceast MF30 equipment was used for polymers in melt flow rate measurements. Unless otherwise noted, the die temperature was controlled at 230° C. while the loading cell weight was at 3.8 kg. The dried pellets were used near 20° C. below the $T_g$ over 8 hours.
- Gel permeation chromatography (GPC): Waters Alliance 2695 and Waters Differential Refractometer 2410 were used to make polymer molecular weight measurements. Columns were based on two PL Gel mixed C columns and a guard column (7.8 mm I.D.×30 cm, 5 μm). THF (HPLC grade) was selected as a solvent. Temperature was controlled at 35° C. Ten poly(methyl methacrylate) standards were used in the calibration, ranging in $M_p$ (peak molecular weight) from 550 to 1,677,000 g/mole.
- Differential scanning calorimetry (DSC): The glass transition temperatures of acrylic polymers were measured at a heating rate of 10° C./minutes in $N_2$ using TA instruments Q2000 DSC, during the second heating. The first heating was used to heat the sample to 170° C. at a heating rate of 10° C./minute, then, the sample was cooled down to 0° C. at a cooling rate of 10° C./minute. The sample weight was controlled at 5-10 mg.
- Thermogravimetry (TGA): The thermal decomposition temperatures of acrylic polymers were measured at a heating rate of 10° C./minute in $N_2$ using TA instruments Q5000 TGA. The sample weight was controlled at 5-10 mg. The samples were pre-dried under a vacuum oven at 100° C. for 16 hours. Isothermal TGA measurements were operated at a heating rate of 10-50° C. per minute using TA instruments Q5000 TGA to reach a selected isothermal temperature such as 270° C. in $N_2$ or air for a certain period of time such as 30 to 60 minutes.
- Total light transmission: The total light transmission was measured from film and/or plaque samples in a transmission mode using Perkin Elmer Lambda 950 with a 150 mm integrating sphere. The selected UV/Vis wavelength range was from 200 nm to 800 nm in UV/Vis region.
- Haze: Optical haze of clear film and/or plaque samples was measured using BYK HazeGard Plus.
- Tensile strength and elongation: The tensile strength, modulus and elongation of the tensile bars was evaluated using Instron Model 4202 at the crosshead speed of 5 mm/minute. The tensile was at 6" in length while the width was at 0.50". The sample thickness was at 0.125".
- Bi-axial stretching: Film samples 4"×4" in size were stretched using a Bruckner at a speed of 0.05%/second to 50%/second. The bi-axial stretching temperature used was near the glass transition temperature or Tg−20° C. to Tg+35° C. The film thickness was controlled at 100-500 μm.
- In-plane and out-of plane retardation: The in-plane retardation from optical film was measured at a selected wavelength of 560 nm or the whole visible wavelength using an ellipsometer (J. A. Woollam Co. Inc.) in a transmission while the out-of-plane retardation was obtained at a selected wavelength of 560 nm or the whole visible wavelength.

Example 1

This example demonstrates the preparation of a high molecular weight copolymer of methyl methacrylate and methacrylic acid (pMMA-MAA, 94/6 w/w). 9260 g of methyl methacrylate and 700 g of methacrylic acid were charged into a reaction vessel near 0° C. under $N_2$ with a mechanical stirring speed of 100 rpm. In addition, Luperox® 531 (from Arkema) was used as an initiator at the level of 1.6 g while 38 g of n-dodecyl mercaptan (n-DDM from Aldrich) was used as a chain transfer agent. The polymerization reaction occurred at 150° C. for 5 hours. When the conversion reached near 55%, the residual monomers were removed through a venting system during the extrusion. The resulting polymers went through a single-screw extruder at a die temperature of 230° C. while the barrel temperatures were at 230-250° C. The melt streams went through a water bath before the pelletization. The polymers were then pelletized into 3-4 mm long resin pellets and dried at 100° C. in a desiccator oven for 8 hours. The melt flow rate of the polymer was measured at 1.4 g/10 minutes at 230° C. under 3.8 kg. The refractive index of the resulting polymer was measured to be 1.496 at 589 nm.

The resulting polymer was found by $^1$H NMR to possess the composition of pMMA/MAA (94/6 w/w). The glass transition temperature of the resin was measured as being 127° C. in $N_2$ using DSC at a heating rate of 10° C./minute. The weight average molecular weight Mw of the resin was measured to be 88,500 g/mole using GPC along with a Mw/Mn (polydispersity) value of 2.0. The light transmission was measured to be 91.6% at 560 nm using Lambda 950, while the haze was measured to be 0.6% using a hazemeter (Haze Gard Plus from BYK). The tensile modulus of the polymer was found to be 3.4 GPa while the tensile strength was 76 MPa; the tensile elongation was 9%.

Example 2

This example demonstrates the preparation of a high molecular weight copolymer of methyl methacrylate and methacrylic acid (pMMA-MAA, 98/2 w/w). 9780 g of methyl methacrylate and 200 g of methacrylic acid were charged in to a reaction vessel near 0° C. under $N_2$ with a mechanical stirring speed of 100 rpm. In addition, Luperox® 531 (from Arkema) was used as an initiator at a level of 1.6 g while 18 g of n-dodecyl mercaptan (n-DDM from Aldrich) was used as a chain transfer agent. The polymerization reaction occurred at 150° C. for 5 hours. When the conversion reached 50%, the residual monomers were removed through a venting system. The resulting polymer was passed through a single-screw extruder at a die temperature of 230° C. while the barrel temperatures were at 230-250° C. The melt stream went through a water bath before the pelletization. Then the polymer was pelletized into 3-4 mm long resin pellets and dried at 100° C. in a desiccator oven for 8 hours. The melt flow rate of the polymer was measured to be 0.46 g/10 minutes at 230° C. under 3.8 kg. The refractive index of the resulting polymer was measured to be 1.493 at 589 nm.

The resulting polymer was confirmed using $^1$H NMR to possess the composition of pMMA/MAA (98/2 w/w). The glass transition temperature of the resin was measured to be 122° C. in $N_2$ using DSC at the heating rate of 10° C./minute. The weight average molecular weight Mw of the resin was measured as being 145,000 g/mole using GPC along with a Mw/Mn (polydispersity) value of 2.2. The light transmission was measured to be 91.8% at 560 nm using Lambda 950 while the haze was measured to be 0.7% using a hazemeter (Haze Gard Plus from BYK). The tensile modulus of the test sample was 3.1 GPa while the tensile strength was 71 MPa, along with a tensile elongation of 10%.

Example 3

This example demonstrates the preparation of a resin comprising a high molecular weight copolymer of methyl methacrylate and methacrylic acid (pMMA-MAA, 98/2 w/w) and antioxidants (AO). 6 g of Irganox® primary anti-oxidant and 3 g of Irgafos® secondary anti-oxidant were compounded into 3000 g of a pMMA-MAA resin made in accordance with Example 2 using a 27 mm twin-screw extruder with a vacuum pump system at a die temperature of 230° C. and a barrel temperature of 260° C., using a speed of 25 kg/hour. The melt stream went through a water bath before pelletization. Melt flow rate (MFR) of the dried resin was measured to be 0.45 g/10 minutes at a temperature of 230° C. under 3.8 kg. The refractive index of the resulting polymer was measured to be 1.493 at 589 nm.

The glass transition temperature of the resin was measured to be 121° C. in $N_2$ using DSC at a heating rate of 10° C./minute. The weight average molecular weight Mw of the resin was measured to be 146,000 g/mole using GPC along with a Mw/Mn (polydispersity) value of 2.3. The light transmission was measured to be 91.5% at 560 nm using Lambda 950 while the haze was measured to be 1.1% using a hazemeter (Haze Gard Plus from BYK). The tensile modulus of the resin was 3.2 GPa while the tensile strength was 74 MPa, along with a tensile elongation of 12%.

Example 4

This example, which represents a preferred embodiment of the invention, demonstrates the preparation of a copolymer of methyl methacrylate, alpha-methylstyrene, methacrylic acid and n-butyl acrylate (pMMA-alpha-methyl styrene-MAA-BA) having a Tg of approximately 140° C. using emulsion polymerization.

A mixture of 440 g alpha-methylstyrene, 40 g methacrylic acid, 20 g n-butyl acrylate, 1500 g methyl methacrylate, and 8 g n-dodecyl mercaptan was prepared. 2 g of sodium dioctyl sulfosuccinate was then dissolved in the monomer mixture. To an appropriate reaction kettle with mechanical agitation was added 3000 g deionized water with 3 g sodium dodecylbenzenesulfonate. The kettle mixture was heated to 70° C. and degassed with nitrogen for 30 minutes. The reactor was charged with 300 g of the monomer mixture, followed by 15 g of 2% sodium formaldehyde sulfoxylate. After 5 minutes, 15 g of 2% t-butyl hydroperoxide was added to initiate the seed latex.

After the mixture reached 8% solids (90% conversion), the remaining 1710 g of monomer mixture was fed to the reactor over 4 hours. 85.5 g of 2% t-butyl hydroperoxide and 85.5 g of 2% sodium formaldehyde sulfoxylate were fed separately over the same 4 hour period. The latex was allowed to cure for 1 hour at 70° C. after monomer addition, then cooled, filtered and freeze-dried before compounding. An 18 mm twin-screw extruder was used for the compounding at the die temperature of 230° C. Then the polymers were pelletized into 3-4 mm long resins and dried at 110° C. in a desiccator oven for 8 hours. The melt flow rate of the polymer was measured to be 0.35 g/10 minutes at 230° C. under 3.8 kg. The refractive index of the resulting polymer was measured to be 1.521 at 589 nm.

The resulting polymer was confirmed by $^1$H NMR to possess a composition of pMMA/MAA/alpha-methyl styrene/BA (75/2/22/1 w/w/w/w). The glass transition temperature of the resin was measured to be 138° C. in $N_2$ using DSC at a heating rate of 10° C./minute. The weight average molecular weight Mw of the resin was measured to be 144,000 g/mole using GPC along with a Mw/Mn (polydispersity) value of 2.6. The light transmission was measured to 90.4% at 560 nm using Lambda 950 while the haze was measured to be 1.5% using a hazemeter (Haze Gard Plus from BYK).

Example 5

4500 g pMMA-MAA (95/5) (a copolymer of 95 wt. % methyl methacrylate and 5 wt. % methacrylic acid, having a weight average molecular weight Mw of 145,000-150,000 g/mole) was blended with 1000 g of the poly(MMA/alpha-methyl styrene/MAA/BA) prepared in accordance with Example 4 and 4500 g high MW pMMA/EA (97/3) (a copolymer of 97 wt. % methyl methacrylate and 3 wt. % ethyl acrylate, having a weight average molecular weight, Mw, of 145,000-150,000 g/mole) through hot melt compounding processes at high temperature, to further improve heat resistance, mechanical properties, and moisture resistance. The compounding was conducted using a twin-screw extruder with a venting system at a die temperature and barrel temperature of 230° C. and 245° C., respectively, along with a speed of 25 kg/hour. Then the polymers were pelletized into 3-4 mm long resin pellets and dried at 100° C. in a desiccator oven for 8 hours. The melt flow rate of the polymer was measured to be 1.3 g/10 minutes at 230° C. under 3.8 kg. The refractive index of the resulting resin was measured to be 1.496 at 589 nm.

The glass transition temperature of the blended resin was measured to be 120° C. in $N_2$ using DSC at a heating rate of 10° C./minute. The weight average molecular weight Mw of the resin was measured to be 108,000 g/mole using GPC along with a Mw/Mn (polydispersity) value of 2.1. The light transmission was measured to 90.5% at 560 nm using Lambda 950 while the haze was measured to be 0.8% using a hazemeter (Haze Gard Plus from BYK). The tensile modulus of the resin was 3.3 GPa while the tensile strength was 72 MPa, along with a tensile elongation of 8%.

What is claimed is:
1. An acrylic resin composition comprising:
   a copolymer of methyl methacrylate and methacrylic acid, the copolymer having a weight average molecular weight of at least 60,000 g/mole and a glass transition temperature of at least 115° C., wherein methyl methacrylate comprises from 70 to 99 weight % of the copolymer;

a polymer of
methyl methacrylate,
methacrylic acid,
ethyl acrylate or n-butyl acrylate, and
styrene or α-methylstyrene;
the polymer having a weight average molecular weight of at least 60,000 g/mole and a glass transition temperature of at least 115° C.; and
an additional polymer of methyl methacrylate and one or more $C_1$-$C_4$ alkyl esters of acrylic acid, wherein the additional polymer has a weight average molecular weight of at least 130,000 g/mole.

2. The acrylic resin composition of claim 1, wherein the copolymer has a weight average molecular weight of at least 80,000 g/mole.

3. The acrylic resin composition of claim 1, wherein the copolymer has a weight average molecular weight of at least 100,000 g/mole.

4. The acrylic resin composition of claim 1, wherein the copolymer has a glass transition temperature of at least 120° C.

5. The acrylic resin composition of claim 1, wherein the copolymer has a refractive index of 1.45-1.53 at a wavelength of 589 nm.

6. The acrylic resin composition of claim 1, wherein the methacrylic acid of the copolymer comprises from 1 to 7 weight % of the copolymer.

7. The acrylic resin composition of claim 1, wherein the methyl methacrylate of the copolymer comprises from 79 to 99 weight % of the copolymer.

8. The acrylic resin composition of claim 1, wherein the copolymer has a light transmission of at least about 88%, and less than 10% haze when measured by ASTM D1003 on a 3.2 mm thick plaque.

9. The acrylic resin composition of claim 1, wherein the copolymer has a melt flow rate of about 0.3 to about 2.5 g/10 minutes at 230° C. under 3.8 kg.

10. The acrylic resin composition of claim 1, wherein the acrylic resin composition further comprises at least one additive selected from the group consisting of antioxidant, UV stabilizer, and toughening agent.

11. The acrylic resin composition of claim 10, wherein the at least one antioxidant is selected from the group consisting of phosphite antioxidants, phosphate antioxidants, phosphonate antioxidants, phosphine antioxidants, phenolic antioxidants, triazinetrione antioxidants and combinations thereof.

12. The acrylic resin composition of claim 10, wherein the at least one UV stabilizer is selected from the group consisting of benzophenone UV stabilizers, benzotriazole UV stabilizers, hydroxyphenyl benzotriazole UV stabilizers, hydroxyphenyl triazine UV stabilizers, benzoxazinone UV stabilizers and combinations thereof.

13. The acrylic resin composition of claim 10, wherein the at least one toughening agent is selected from the group consisting of block copolymer toughening agents and core-shell toughening agents.

14. The acrylic resin composition of claim 1, wherein the additional polymer is a copolymer of methyl methacrylate and at least one comonomer selected from ethyl acrylate or methyl acrylate.

* * * * *